April 5, 1927.

L. R. McDONALD 1,623,742

VARIABLE ELECTRICAL CONDENSER

Filed March 7, 1924

Inventor,
Leslie R. McDonald
By his Attorney
Andrew Wilson

Patented Apr. 5, 1927.

1,623,742

UNITED STATES PATENT OFFICE.

LESLIE R. McDONALD, OF WESTMOUNT, QUEBEC, CANADA.

VARIABLE ELECTRICAL CONDENSER.

Application filed March 7, 1924. Serial No. 697,433.

My invention relates to that class of variable electrical condensers which may be designated as micrometer condensers, whereby a very high degree of accuracy of adjustment may be obtained; and my improvements are particularly directed to improved means for permitting and insuring highly accurate adjustment with a minimum of disturbance from outside influences.

Figure 1:
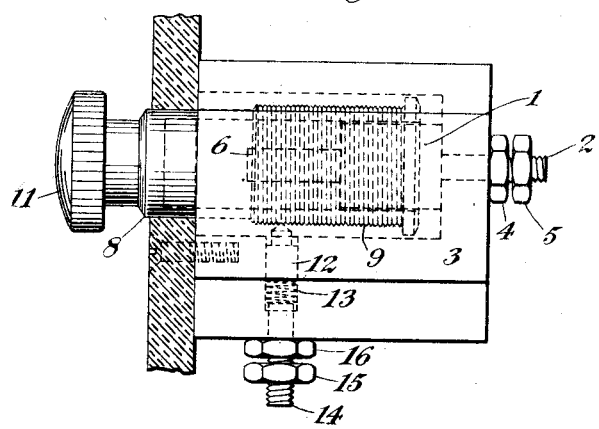
Figure 2:
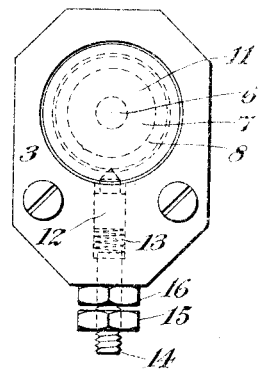
Figure 3:
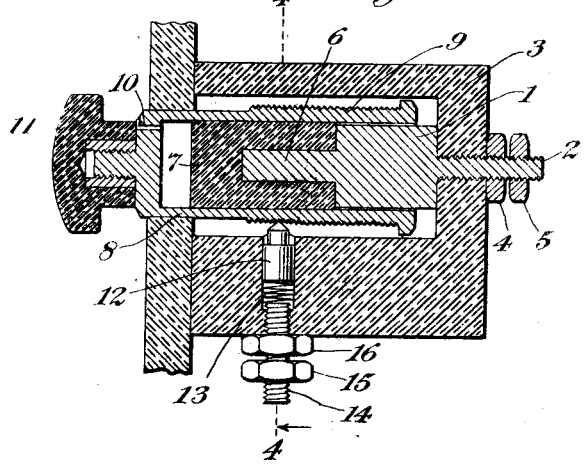
Figure 4:
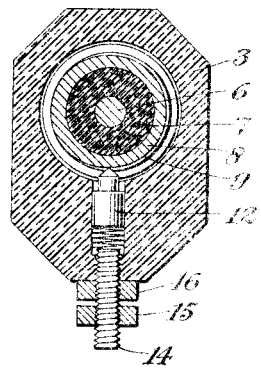

In the drawings Fig. 1 is an elevation of an embodiment of my improved condenser; Fig. 2 is an end view of the same, looking to the right on Fig. 1, the mounting panel being omitted; Fig. 3 is a longitudinal sectional view; and Fig. 4 is a cross sectional view taken as on the line 4—4 of Fig. 3, looking to the right.

Similar parts are designated by corresponding reference numerals in all the figures.

The body 1 of the condenser is formed of suitable conductive material such as brass or the like, and is provided with a suitable shank or extension 2 for conveniently attaching it within a casing of insulating material 3, as by nuts 4, 5, which also serve for connecting it with a line wire. The opposite end of the body 1 is provided with a reduced portion or shank 6. A cylindrical body 7, of suitable dielectric material, is molded or mounted upon the shank 6, so as to be held thereby, the diameter of the cylinder 7 being slightly greater than that of the body 1.

A tube 8, of suitable conductive material such as brass, is bored to fit accurately over the cylinder 7, practically without lateral play, but so as to permit longitudinal telescoping movement between the tube and cylinder. The exterior of the tube carries a screw thread 9, the fineness and the pitch of which are governed by the desired accuracy of adjustment.

The tube 8 is provided with a suitable air vent, as 10; and the tube is also provided with a manipulating element of non-conductive material such as a knob 11.

A conically pointed conductor contact 12 is slidably mounted in a recess in the body 3, and is pressed to duty by a spring 13 seated against the bottom of the recess; and a rod 14 is threaded into the body 3 so that the end of the rod will make contact with the spring 13. This rod 14 is provided with suitable means, as nuts 15 and 16 for the attachment of a line wire. The tension of the spring 13 may be measured by screwing the rod 14 in so as to compress the spring. This arrangement insures a reliable contact between the conductor 12 and the tube 8, the conductor 12 yielding sufficiently to permit the tube 8 to be slid to or fro on the dielectric 7 for approximate adjustment, the point of the contact 12 riding over the thread 9 so as to permit this.

In operation, therefore, the tube 8 is, preferably, brought to an approximate adjustment by sliding it to or fro past the spring conductor 12, which may be allowed to ride across the thread, after which the adjustment is perfected by rotating the cylinder 8 by means of the knob 11, so as to cause the thread 9 to travel forward or back under the end of the conductor 12 until the desired degree of adjustment has been obtained.

The longitudinal movement of the tube 8 relative to the body 1, varies the influence of the dielectric 7, and also varies the influence of the atmospheric dielectric lying between the body 1 and the portion of the tube 8 which may be surrounding it, so that a very refined degree of adjustment may be obtained. This may be assisted also by the use of a suitable lubricant such as vaseline, which will increase the smoothness of movement between the tube 8 and its supporting dielectric, and may also, with advantage, be applied over the body 1.

It will be understood that the embodiment of my invention which I have illustrated and described is to be regarded as a typical and not as an exclusive form. For it is obvious that details of construction may be modified, as by the use of mechanical equivalents or the like, without departing from the spirit of my invention as claimed.

Having thus described my invention, what I claim and desire to secure by Letters Patent of the United States is:—

1. In a variable electrical condenser, the combination of relatively telescopable and rotatable conducting elements, an interposed dielectric, and connecting means maintaining an unbroken contact with one of said elements for causing rotation of such element to produce longitudinal adjustment thereof, and also automatically permitting free longitudinal adjustment of such elements.

2. In a variable electrical condenser, the combination, within a body of non-conducting material, of a fixed, cylindrical conductor, a tubular conductor sliding longitudinally outside of the cylindrical conductor and provided with an exterior screw thread, a connector projecting through said body and having a terminal yieldably engaging with said screw thread to cause said tubular conductor to move longitudinally when rotated, and optionally permitting free, longitudinal movement of the conductor, and a dielectric interposed between the conductors.

3. In a variable electrical condenser, the combination of a cylindrical conductor, a tubular conductor sliding longitudinally outside of the cylindrical conductor and provided with an exterior screw thread, a spring connector, having its free end normally engaging with the screw thread to cause longitudinal adjustment of the tubular conductor by rotation thereof, said connector being yieldable to permit optional longitudinal movement of the tubular conductor past the connector, and a dielectric interposed between the conductors.

4. In a variable electrical condenser, the combination of a cylindrical conductor, a tubular conductor sliding longitudinally outside of the cylindrical conductor and provided with an exterior screw thread, a spring connector, having its free end normally engaging with the screw thread to cause longitudinal adjustment of the tubular conductor by rotation thereof, said connector being yieldable to permit optional longitudinal movement of the tubular conductor past the connector, and a dielectric interposed between the conductors and serving as a guide for the tubular conductor.

5. In a variable electrical condenser, the combination of a cylindrical conductor, a cylindrical dielectric carried thereby, a tubular conductor, slidable longitudinally over and guided by the dielectric, and provided with a screw thread upon its outer surface, a yieldable connector having its free end normally engaging with the screw thread.

6. In a variable electrical condenser, the combination of a cylindrical conductor, a cylindrical dielectric of slightly larger diameter than the body of such conductor carried thereby, a tubular conductor sliding longitudinally over the dielectric, and provided with an exterior screw thread, and a spring connector having its free end normally engaging with said screw thread.

LESLIE R. McDONALD.